(12) United States Patent
Ma et al.

(10) Patent No.: US 11,892,391 B2
(45) Date of Patent: Feb. 6, 2024

(54) FIELD MONITORING ELECTROCHEMICAL METHOD FOR ANTICORROSION PERFORMANCE OF ORGANIC COATINGS IN SEAWATER ENVIRONMENT

(71) Applicant: Beihang University, Beijing (CN)

(72) Inventors: Xiaobing Ma, Beijing (CN); Haodi Ji, Beijing (CN); Yikun Cai, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/982,552

(22) Filed: Nov. 8, 2022

(65) Prior Publication Data

US 2023/0143519 A1    May 11, 2023

(30) Foreign Application Priority Data

Nov. 11, 2021 (CN) .......................... 202111333287.6

(51) Int. Cl.
  *G01N 17/02* (2006.01)
  *C09D 5/08* (2006.01)

(52) U.S. Cl.
  CPC .............. *G01N 17/02* (2013.01); *C09D 5/086* (2013.01)

(58) Field of Classification Search
  CPC .................. G01N 17/02; G01N 19/08; G01N 2033/0096; G01N 27/26; C09D 5/086
  (Continued)

(56) References Cited

U.S. PATENT DOCUMENTS 4,190,502 A * 2/1980 Kanno .................... G01N 17/02
                                                             205/775.5
5,425,867 A * 6/1995 Dawson ................. G01N 17/02
                                                             324/71.2
(Continued)

FOREIGN PATENT DOCUMENTS

AU       2004203920 B2 *   4/2008     ............ C08F 251/02
CN          102564935 A  *   7/2012
(Continued)

OTHER PUBLICATIONS

Touzain et al., Evaluation of thick organic coatings degradation in seawater using cathodic protection and thermally accelerated tests. Progress in Organic Coatings 52 (2005) 311-319. © 2004 Elsevier B.V. (Year: 2004).*

(Continued)

*Primary Examiner* — Patrick Assouad
*Assistant Examiner* — Sean Curtis
(74) *Attorney, Agent, or Firm* — Bayramoglu Law Offices LLC

(57) ABSTRACT

An electrochemical method for field monitoring of protective properties of organic coatings in seawater environment includes:
  Step 1: Determine the actual service environment of the coating structure and prepare the simulated electrolyte solution.
  Step 2: Select the anode block for testing.
  Step 3: Test the corrosion current and potential of the coating structure under different manual peeling areas.
  Step 4: Fit the peeling area model of organic coating.
  Step 5: Real-time monitoring of the actual service coating peeling area.
Through the method, we reached to map the deteriorating state of the organic coating to metal substrate for coating on the activity of area of the effect of stripping state recognition, (Continued)

resolved to organic anticorrosive coating anticorrosion performance timely and accurate assessment of the actual problem, achieved by monitoring the anode current to evaluate the organic coating stripping area. This method is scientific and has good technics and broad application value.

1 Claim, 3 Drawing Sheets

(58) Field of Classification Search
USPC .......................................................... 324/700
See application file for complete search history.

(56) References Cited

U.S. PATENT DOCUMENTS

| | | | | |
|---|---|---|---|---|
| 5,859,537 | A * | 1/1999 | Davis | G01N 17/02 |
| | | | | 324/71.2 |
| 8,309,028 | B2 * | 11/2012 | Raguse | G01N 27/127 |
| | | | | 422/50 |
| 8,497,130 | B2 * | 7/2013 | Raguse | G01N 27/26 |
| | | | | 422/50 |
| 10,684,213 | B1 * | 6/2020 | Delbridge | G01N 17/02 |
| 11,105,731 | B1 * | 8/2021 | Satchell | G01N 27/06 |
| 2004/0176934 | A1 * | 9/2004 | Kihira | G01N 17/006 |
| | | | | 324/700 |
| 2010/0276302 | A1 * | 11/2010 | Raguse | G01N 27/26 |
| | | | | 427/58 |
| 2013/0126363 | A1 * | 5/2013 | Raguse | G01N 27/26 |
| | | | | 205/787 |
| 2022/0326141 | A1 * | 10/2022 | Bargallo | G01N 17/02 |
| 2023/0143519 | A1 * | 5/2023 | Ma | C09D 5/086 |
| | | | | 324/700 |

FOREIGN PATENT DOCUMENTS

| | | | | | |
|---|---|---|---|---|---|
| CN | 106018262 | A | * | 10/2016 | |
| CN | 106323861 | A | * | 1/2017 | |
| CN | 110658128 | A | * | 1/2020 | |
| CN | 112285013 | A | * | 1/2021 | |
| CN | 114112884 | A | * | 3/2022 | |
| CN | 114137044 | A | * | 3/2022 | ............. C09D 5/086 |
| CN | 114609028 | A | * | 6/2022 | |
| CN | 115613039 | A | * | 1/2023 | |
| CN | 115901602 | A | * | 4/2023 | |
| CN | 113553784 | B | * | 5/2023 | |
| JP | 5206386 | B2 | * | 6/2013 | |
| JP | 6871497 | B2 | * | 5/2021 | |
| WO | WO-2016002897 | A1 | * | 1/2016 | ............. G01N 27/26 |

OTHER PUBLICATIONS

Zhang et al., Study of Degradation of Organic Coatings in Seawater by Using EIS and AFM Methods. Journal of Applied Polymer Science, vol. 109, 1890-1899 (2008) VVC 2008 Wiley Periodicals, Inc. (Year: 2008).*

Scully, John R., Electrochemical Impedance of Organic-Coated Steel: Correlation of Impedance Parameters with Long-Term Coating Deterioration. J. Electrochem. Soc., vol. 136, No. 4, Apr. 1989 © The Electrochemical Society, Inc. (Year: 1989).*

Thu et al., EIS characterization of thick flawed organic coatings aged under cathodic protection in seawater. Electrochimica Acta 51 (2006) 2491-2502. © 2005 Elsevier Ltd (Year: 2005).*

Narozny et al., Application of Electrochemical Impedance Spectroscopy to evaluate cathodically protected coated steelin seawater. INSPEC. Aug. 2018 (Year: 2018).*

GB 3097-1997, Sea water quality standard, China National Standards, 1997.

GB/T 7790-2008, Paints and varnishes-Determination of resistance to cathodic disbonding of coatings exposed to sea water, China National Standards, 2008, pp. 1-6.

* cited by examiner

FIELD MONITORING ELECTROCHEMICAL METHOD FOR ANTICORROSION PERFORMANCE OF ORGANIC COATINGS IN SEAWATER ENVIRONMENT

CROSS REFERENCE TO THE RELATED APPLICATIONS

This application is based upon and claims priority to Chinese Patent Application No. 202111333287.6, filed on Nov. 11, 2021, the entire contents of which are incorporated herein by reference.

TECHNICAL FIELD

This patent is an electrochemical method for field monitoring of the protective performance of an organic coating in a seawater environment, that is, a method for evaluating the peeling area of an epoxy resin organic anticorrosion coating on a metal structure in a seawater immersion environment based on electrochemical theory. This method evaluates the peeling area of organic anticorrosion coatings based on the fundamental equation of electrochemical polarization, mixed potential theory and the corrosion galvanic couple theory, and systematically establishes the relationship model between the metal matrix potential, the anodic current and the peeling area of the organic coating. This correlation model can quantitatively describe the degradation process of organic coatings. The core theory of this method is to map the deterioration state of the organic anti-corrosion coating to the active area of the metal matrix, which is convenient for the identification of the peeling state of the coating and further life evaluation. In summary, this method is suitable for the service life evaluation of the coating structure under cathodic protection with epoxy resin as the main coating material and sacrificial anode applied in the seawater environment.

BACKGROUND

Coating is currently the main method for protecting metal materials and preventing corrosion widely used in various industries, among which organic coatings are the most widely used. The main mechanism of organic coating anti-corrosion is the barrier effect, which prevents aggressive particles, water, oxygen and other harmful substances from contacting the metal. The good adhesion between the organic coating and the metal also plays a role in preventing metal corrosion. The main forms of coating failure are coating peeling and breakage. Compared with breakage failure, the damage caused by coating peeling is more difficult to predict because it is more invisible. There are three main forms of organic coating peeling from metal surfaces, osmotic bubbling, cathodic disbonding and anodic destruction. Among them, cathodic disbondment is the most important form of protective performance failure of coating/metal system. Since the defects in the coating are not uniformly distributed, there are differences in the order and degree of damage at the metal interface of the coating, which leads to the formation of corroded microbatteries. When the coating metal is galvanically corroded, the cathodic reaction or cathodic reaction products will affect the bonding of the coating to the base metal, causing the coating to separate from the base metal.

The existing evaluation indicators for the aging state of organic anti-corrosion coatings usually include loss of gloss, degree of discoloration, degree of differentiation and cracking, bubble density, peeling area, etc., which are impossible to timely and accurately evaluate the anti-corrosion performance of organic anti-corrosion coatings.

According to previous studies, in the coating peeling area, the corrosive medium is transmitted to the interface area of the coating/substrate, forming a microscopic corrosion galvanic cell, which in turn causes the substrate to corrode. Therefore, electrochemical methods can be used to measure the active metal area exposed to electrochemical reactions in the electrolyte, and the metal active area can be used to characterize the failure area of the organic coating.

Based on the above, the present invention establishes a correlation model between the potential of the metal substrate, the anode current and the peeling area of the organic coating by combining the potential monitoring data in the organic anti-corrosion coating/metal matrix system, the anode current monitoring data under the condition of an external anode metal, and the corrosion galvanic couple principle, which can realize the evaluation of the peeling area of the organic coating.

SUMMARY (1) The Purpose of the Invention

In view of the serious deterioration of the organic coating structure in the cathode region, and there is no accurate and reasonable method for detecting the peeling area of the organic coating, an electrochemical method for field monitoring of the protective performance of the organic coating in the seawater environment is provided. It is an organic coating peeling area evaluation method including potential monitoring data analysis in organic anti-corrosion coating/metal matrix system, anode current monitoring data analysis under the condition of external anode metal, and corrosion galvanic principle. By measuring the anodic corrosion current, metal matrix potential and organic coating peeling area of the coated metal structure in the test electrolyte solution environment, the relationship model between the organic coating peeling area and the anodic current and metal substrate potential was established. Thus, the evaluation of the peeling area of the organic anti-corrosion coating on the metal structure is realized.

(2) The Invention Patent is Based on the Following Basic Assumptions

Assumption 1: The peeling area of organic anticorrosive coating is an important parameter affecting the anticorrosive performance of organic anticorrosive coating. Cathodic disbonding failure of organic coatings is due to the effect of cathodic reaction or cathodic reaction products on the bonding between coatings and substrate metals, resulting in the separation of coatings from substrate metals.

Assumption 2: The corrosion potential of the anode and cathode electrode reaction is far from the equilibrium potential of the reaction between the two electrodes, so the inverse process of the reaction between the two electrodes can be ignored. The kinetic formula of each electrode reaction can be expressed by Tafel formula $$I_a = I_{0,a}\exp\left(\frac{E-E_{e,a}}{\beta_a}\right) \quad (1)$$

$$|I_c| = I_{0,c}\exp\left(-\frac{E-E_{e,a}}{\beta_a}\right) \quad (2)$$

where $I_a$ is the anode electrode reaction current density, $I_{0,a}$ is the current exchange density at the anode electrode reaction equilibrium, E is the electrode potential applied currently; $E_{e,a}$ is the anode electrode reaction equilibrium potential, $I_c$ is the cathode electrode reaction current density, $I_{0,c}$ is the cathode electrode reaction current exchange density at the cathode electrode reaction equilibrium, $E_{e,c}$ is the cathode electrode reaction equilibrium potential.

Assumption 3: The velocity of corrosion process of corroded metal electrode is not controlled by the diffusion process of cathode reaction. The potential-current curve of corroded metal electrode conforms to the three-parameter polarization curve equation:

$$I = I_{corr}\left[\exp\left(\frac{\Delta E}{\beta_a}\right) - \exp\left(-\frac{\Delta E}{\beta_a}\right)\right] \quad (3)$$

where, I is the external measured current density, $\Delta E$ is the polarization value of the corroded metal electrode, $\beta_a$ is the anode tafel slope of the corroded metal electrode, $\beta_c$ is the cathode tafel slope of the corroded metal electrode.

Assumption 4: In the test electrolyte, only one depolarizer was involved in the electrode reaction, and only one anodic reaction and one cathodic reaction were carried out at the same time on each isolated electrode, instead of multiple electrode reactions occurring at the same time. In the electrode reaction process, the mass transfer process was fast, and the concentration polarization could be neglected.

Assumption 5: Before the organic anti-corrosion coating is peeled off, its excellent anti-corrosion performance can perfectly separate the metal matrix from the corrosive medium. In this case, the metal matrix will not produce electrochemical corrosion, and the metal matrix under the organic anti-corrosion coating is regarded as not participating in the electrochemical reaction.

The method of the invention mainly includes potential monitoring data in the organic anti-corrosion coating/metal system, anode current monitoring data under the condition of external anode metal and corrosion galvanic theory. The correlation model of metal matrix potential, anode current and organic coating peeling area is established to realize the evaluation of organic coating peeling area.

(3) Based on the above assumptions and ideas, the present invention relates to a field monitoring electrochemical method for the protective performance of organic coatings in seawater environment, which is realized by the following steps:

Step 1: Determine the actual service environment of the coating structure and prepare the simulated electrolyte solution.

The actual service environment of the coating is sampled to measure the type and concentration of ions related to the corrosion reaction in the service seawater, such as chloride concentration. In addition, the concentration and pH of dissolved oxygen in seawater samples should be measured. According to the service environment of the coating structure, the electrolyte solution of the test system should be a simulated solution or a real solution of the actual service environment of the coating structure. In the electrolyte solution, the types and concentrations of various ions should be consistent with the actual service environment to ensure that the corrosion reaction process and corrosion products of the coating structure are the same as the actual situation, and there is only one depolarizer to control the corrosion reaction with the metal matrix material in the electrolyte solution.

Step 2: Select the anode block for testing.

The coated metal sample is used as the working electrode, the inert metal electrode is used as the auxiliary electrode, the saturated silver chloride electrode is used as the reference electrode, and the simulated solution in Step 1 is used as the test electrolyte solution to constitute the electrochemical test three-electrode system. The metal matrix sample is immersed in the test electrolyte to polarize for a period of time and monitor its open circuit potential. After the open circuit potential is stabilized, the polarization curve of the metal matrix sample in the test electrolyte is measured. The open circuit potential of the metal matrix sample is converted into standard hydrogen electrode potential according to the type of reference electrode, and the electrode reaction standard potential table is searched to find the metal whose electrode reaction potential is much lower than that of the metal electrode to be tested (above 400 mV), which can be used as the test anode metal. The anode metal is made into a sample, and its working area is designed to be about 2%-3% of the whole coated metal structure (about the damage rate of the actual coating in one year of service). The anode block is immersed in the test electrolyte for polarization for a period of time and its open circuit potential is measured. After the open circuit potential is stable, the polarization curve of the anode block in the test electrolyte is measured.

Step 3: Test the corrosion current and potential of the coating structure under different manual peeling areas.

Immerse the coated metal structure to be tested and the test anode block into the test electrolyte solution and connect it through the wire. Under the action of cathodic polarization, the anodic reaction of the coated metal structure is inhibited, while the cathodic reaction is promoted. In the whole galvanic corrosion system, the coated metal becomes the cathode, and the anode block becomes the anode. The non-resistance ammeter is connected in series to the anode and cathode circuit to measure the working current of the test anode block, and the anode current is recorded when it is stable. After that, the reference electrode is immersed in the test electrolyte and connected in series with the coated metal structure to be tested. The potential difference between the reference electrode and the coated metal structure is measured by a voltmeter. The potential of the coated metal structure is calculated by adding the standard potential and potential difference of the reference electrode. After the measurement is completed, a certain area of the coating is damaged artificially, and the metal under the coating is immersed in the test electrolyte to make direct contact with the test electrolyte, and the above measurement is repeated. The artificial damage area was gradually increased, and the anode working current and the potential of the coated metal structure were measured several times. The specific implementation process can be seen in the following case.

Step 4: Fit the peeling area model of organic coating.

When the anode block and the coated metal structure to be tested exist as isolated electrodes in the test electrolyte, the corrosion potential is $E_{corr1}$ and $E_{corr2}$, the corrosion current densities are $I_{corr1}$ and $I_{corr2}$ respectively. When the coated metal structure is connected with the test anode block by a wire in the test electrolyte, the two form a corrosion galvanic couple. In this corrosion couple, the coated metal structure to be tested becomes the cathode, and the test anode block becomes the anode. Under the condition of ignoring concentration polarization and solution resistance, it can be considered that the coated metal structure is polarized to the same potential $E_g$ after connecting with the test anode block. In this case, the polarization current density $I_1$ of the anode block and the polarization current density $I_2$ of the metal structure containing coating are $$I_1 = I_{corr1}\left[\exp\left(\frac{E_g - E_{corr1}}{\beta_{a1}}\right) - \exp\left(-\frac{E_g - E_{corr1}}{\beta_{c1}}\right)\right] \quad (4)$$

$$|I_2| = I_{corr2}\left[\exp\left(\frac{E_g - E_{corr2}}{\beta_{a2}}\right) - \exp\left(-\frac{E_g - E_{corr2}}{\beta_{c2}}\right)\right] \quad (5)$$

where, $\beta_{a1}$ is the anode Tafel slope on the test anode block; $\beta_{c1}$ is the cathode Tafel slope on the test anode block; $\beta_{a2}$ is the anode Tafel slope on the coated metal structure; $\beta_{c2}$ is the cathode Tafel slope on the coated metal structure.

If the areas of contact between the test electrolyte and the solution of the test anode block and the coated metal structure are $A_1$ and $A_2$ then the current $i_g$ in the external circuit of the galvanic corrosion is $$i_g = I_1 A_1 = |I_2| A_2 \quad (6)$$

In practice, since the corrosion potential of the test anode block is much lower than that of the coated metal structure, $E_g$ is far away from $E_{corr2}$ and close to $E_{corr1}$. Therefore, the anodic reaction on the surface of the coated metal structure can be ignored, but the cathodic reaction on the surface of the test anode block cannot be ignored. Thus, Equation (6) can be simplified as $$i_g = I_{a1} A_1 - |I_{c1}| A_1 = |I_{a2}| A_2 \quad (7)$$

where, $I_{a1}$ is the anode dissolution current density after contact between the anode block and the coated metal structure, $|I_{c1}|$ and $|I_{a2}|$ is the absolute value of the cathodic reduction current density of the depolarizer on the anode block and the coated metal structure after contact between the test anode block and the coated metal structure, respectively.

Substituting Equations (1) and (2) into Equation (7), the following equation can be solved:

$$E_g = \frac{\beta_{a1}}{\beta_{a1} + \beta_c} E_{e,c} + \frac{\beta_c}{\beta_{a1} + \beta_c} E_{e,a1} + \frac{\beta_{a1}\beta_c}{\beta_{a1} + \beta_c} \ln\left(\frac{A_1 I_{0,c1} + A_2 I_{0,c2}}{A_1 I_{0,a1}}\right) \quad (8)$$

$$\ln i_g = \frac{E_{e,c} - E_{e,a1}}{\beta_{a1} + \beta_c} + \frac{\beta_{a1}}{\beta_{a1} + \beta_c} \ln(A_1 I_{0,c1}) + \quad (9)$$

$$\frac{\beta_c}{\beta_{a1} + \beta_c} \ln(A_2 I_{0,c2}) - \frac{\beta_{a1}}{\beta_{a1} + \beta_c} \ln\left(1 + \frac{A_1 I_{0,c1}}{A_2 I_{0,c2}}\right)$$

where, $E_{e,c}$ is the cathodic reaction equilibrium potential of the depolarizer, $E_{e,a1}$ is the anode reaction equilibrium potential on the anode block, $I_{0,a1}$ is the anode reaction exchange current density on the anode block, $I_{0,c1}$ is the cathodic reaction exchange current density on the anode block, and $I_{0,c2}$ is the cathodic reaction exchange current density on the coated metal structure.

Equation (8) can be simplified as $$E_g = a + b\ln(c + A_2) \quad (10)$$

where, a, b and c are constants.

$A_2$ gradually increases with the peeling of coating. When $A_2 \gg A_1$, Equation (9) can be simplified as follows:

$$\ln i_g = e + f\ln(A_2) \quad (11)$$

where, e and f are constants.

Equations (10) and (11) can describe the relationship between the potential and current and the peeling area of the coating. In terms of the function form of the two, Equation (10) is logarithmic and the slope gradually decreases with the increase of the peeling area, which is suitable for characterizing the early service period of the coating. Equation (11) is power function, which is only available when the peeling area is large, which is suitable for characterizing the later service period of the coating. The potential and current data measured in Step 3 are used to fit the parameters of Equations (10) and (11), and the relationship model between the peeling area of organic coating and the current and potential can be obtained.

Step 5: Real-time monitoring of the actual service coating peeling area.

Due to the low resistivity of seawater, an anode block can be connected to the coated metal structure with seawater medium and small structure volume. An ammeter, a reference electrode and a voltmeter are connected in the loop to realize the function of estimating the peeling area of organic coating by real-time monitoring of current or potential. The specific method is to connect the zero-resistance galvanometer, reference electrode and voltmeter in the anode and cathode circuit to realize the function of real-time monitoring the anode working current or potential. After the anode current and mixing potential are obtained, the peeling area of the coating can be backward deduced according to Equations (10) and (11) to realize the function of real-time monitoring of the protection performance of the organic coating.

Through the above steps, we reached to map the deteriorating state of the organic coating to metal substrate for coating on the activity of area of the effect of stripping state recognition, resolved to organic anticorrosive coating anti-corrosion performance timely and accurate assessment of the actual problem, achieved by monitoring the anode current to evaluate the organic coating stripping area.

(3) Advantages and Benefits

The invention relates to an electrochemical method for field monitoring of protective properties of organic coatings in seawater environment. It is a method based on electrochemical theory to evaluate the protective performance of organic anticorrosive coatings based on epoxy resin on metal structures. Its advantages are A. The present invention comprehensively establishes a quantitative model method for describing the deterioration process of organic coatings by a correlation model of metal matrix potential, anode current and the damage area of organic coatings in electrolyte.

B. The invention realizes the measurement of the peeling area of the organic coating. Compared with the traditional area measurement method, the calculation of the peeling area of the organic coating is more accurate and reasonable through the electrochemical method.

C. The measuring parameters of the coating structure of the invention are electrochemical parameters, the test method is simple, easy to operate, and it is not destructive to the structure.

D. This evaluation method is scientific, has good technics and broad application value.

DETAILED DESCRIPTION OF THE EMBODIMENTS

The invention will be further described in detail with examples as follows.

Figure 1:
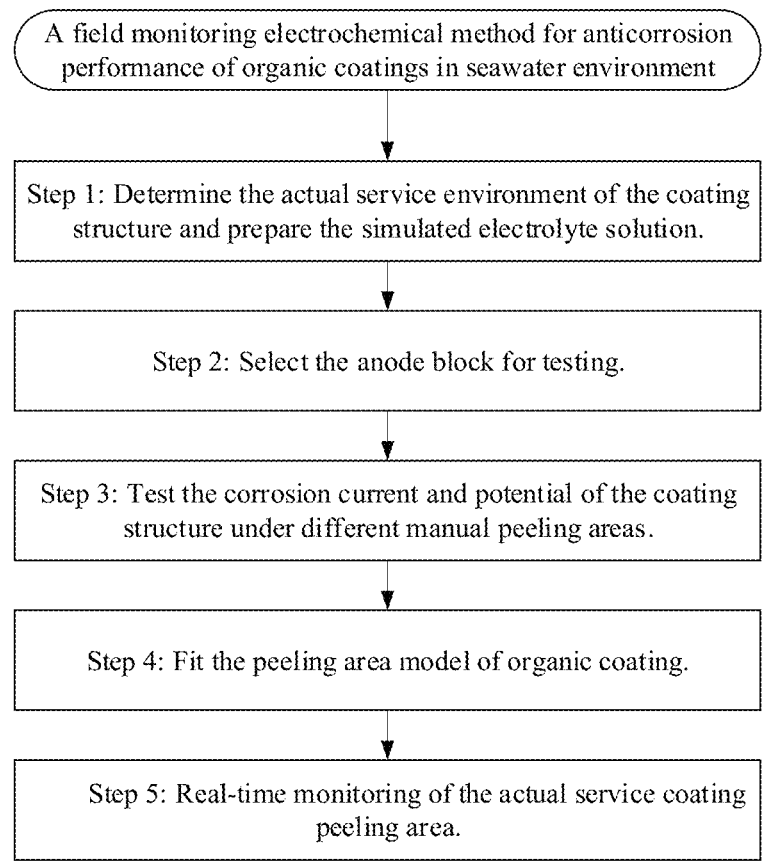
FIG. 1 Flowchart of the method of the invention.

The coating system of the metal structure of a ship ballast tank is three layers of epoxy paint, with a total coating thickness of 375 microns. The service environment is seawater environment, and the total contact area between the coated metal structure and seawater is 82.22 square meters. The invention relates to an electrochemical method for field monitoring of the protective performance of organic coatings in seawater environment. It is a method based on electrochemical theory to evaluate the peeling area of organic anticorrosive coatings based on epoxy resins on metal structures, as shown in FIG. 1. Specific implementation through the following steps:

Step 1: Determine the actual service environment of the coating structure and prepare the simulated electrolyte solution.

The actual service environment of the coated structure in this case is the seawater environment in the ballast tank, the oxygen concentration is about 3-8 mg/L, the seawater pH value is 7.2-8.6 weak alkaline environment, and the anode is sacrificed for cathodic protection. According to GB/T 3097 Seawater Quality Standard, filter seawater or artificial seawater is selected as the simulated electrolyte solution. The water temperature is set to 35±2° C., and the ballast cycle is two weeks full load and one week empty load.

Step 2: Select the anode block for testing.

Figure 2:
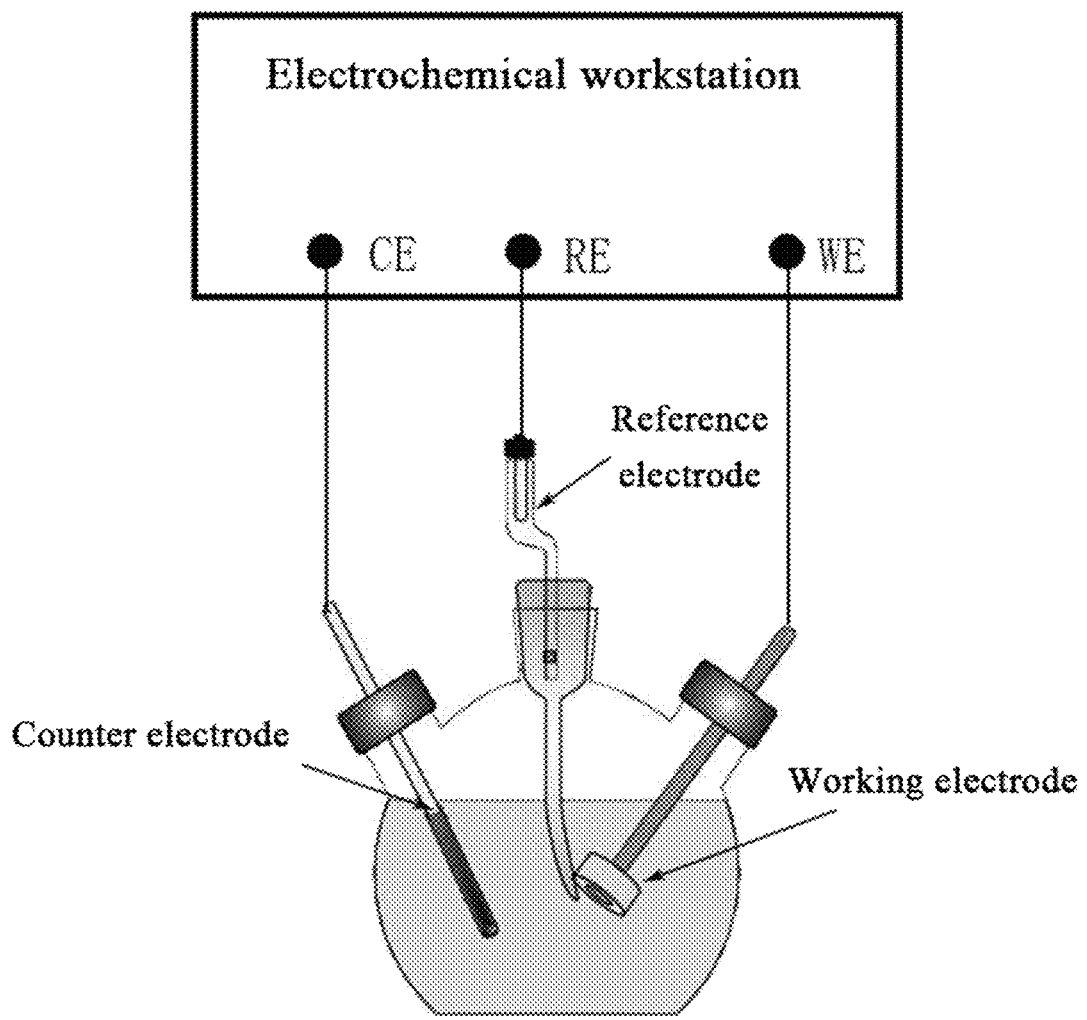
FIG. 2 Schematic diagram of the three-electrode system.

The metal matrix Q235 steel sample under the coating is used as the working electrode, the platinum sheet metal electrode is used as the auxiliary electrode, the saturated silver chloride electrode is used as the reference electrode, and the simulated seawater solution is used as the test electrolyte solution to constitute the electrochemical test three-electrode system. The schematic diagram of the three-electrode system used is shown in FIG. 2. The Q235 steel metal matrix sample is immersed in the test electrolyte to polarize it for a period of time and measure its open circuit potential. After the open circuit potential is stable, the polarization curve of the Q235 steel metal matrix sample in the simulated seawater solution is measured. According to the type of saturated silver chloride electrode, the open circuit potential of Q235 steel metal matrix sample is converted to the standard hydrogen electrode potential of about −600 mV. The open-circuit potential of sacrificial aluminum anode block in this ballast tank is about 1095 mV, which is much lower than that of Q235 steel metal (495 mV). Therefore, the sacrificial anode block AT-8 aluminum alloy is directly selected as the test anode metal. A total of 18 AT-8 aluminum alloy sacrificial anode blocks are used in the experiment. The surface area in the simulated seawater solution is about 1.8 square meters, and the working area is about 2.2% of the whole coated metal structure. The AT-8 aluminum alloy sacrificial anode is immersed in the simulated seawater to polarize it for a period of time. After the open-circuit potential stabilized, the polarization curve of the AT-8 aluminum alloy sacrificial anode in the simulated seawater is measured. The polarization data of the two kinds of metals are shown in Table 1.

TABLE 1

| Q235 steel and aluminum alloy polarization data. | | | |
|---|---|---|---|
| Q235 steel | | Aluminum alloy | |
| Current density (mA/m²) | Potential (mV) | Current density (mA/m²) | Potential (mV) |
| −412 | −1050 | 0 | −1095 |
| −188 | −1020 | 18 | −1090 |
| −120 | −780 | 255 | −1056 |
| 0 | −600 | 2167 | −970 |

Step 3: Test the corrosion current and potential of the coating structure under different manual peeling areas.

The simulated seawater is injected into the metal structure of the ballast tank, and an AT-8 aluminum alloy sacrificial anode block is immersed into the simulated seawater, which is connected to the tank body through a wire. At this time, the anodic reaction of Q235 metal structure in ballast tank is inhibited and the cathodic reaction is promoted under the action of cathode polarization. In the whole galvanic corrosion system, Q235 metal becomes the cathode, and AT-8 aluminum alloy sacrificial anode block becomes the anode. The zero-resistance ammeter is connected in series to the anode and cathode circuit to monitor the working current of the sacrificial anode block of AT-8 aluminum alloy, and the anode current is recorded when it was stable. After that, the silver chloride reference electrode is immersed in the electrolyte and connected in series with the coated metal structure. The potential difference between the reference electrode and the coated metal structure is measured by a voltmeter. The potential of the coated metal structure is calculated by adding the standard potential and potential difference of the silver chloride reference electrode. The coating area of 0.5%, 3.02%, 6.03%, 9.09%, 11.18%, 16.25%, 21.34% are artificially removed. 6 points are selected in the chamber to measure the anode working current and the potential of the coated metal structure multiple times under different peeling areas. The average potential of 6 points is taken as the mixing potential, and the anode current data is the sum of the total anode current of all AT-8 aluminum alloy sacrificial anode blocks. The measured potential and current data are shown in Table 2.

TABLE 2

| Peeling area of coating, measured potential and total anode current data. | | | |
|---|---|---|---|
| Damage area ratio | Peeling area of coating/m² | Average potential/mV | Anode current/mA |
| 0.50% | 0.411 | −1061.0 | 219 |
| 3.02% | 2.482 | −1033.5 | 382 |
| 6.03% | 4.957 | −1016.0 | 445 |
| 9.09% | 7.472 | −1012.0 | 546 |
| 11.18% | 9.190 | −1017.8 | 539 |
| 16.25% | 13.358 | −1003.0 | 794 |
| 21.34% | 17.541 | −995.8 | 1052 |

Step 4: Fit the peeling area model of organic coating.

According to the corrosion couple theory and mixed potential theory, galvanic corrosion is formed between the metal structure of the ballast tank and the sacrificial anode block of AT-8 aluminum alloy in simulated seawater solution. After that, the corrosion potential $E_g$ of the two can be expressed by Equation (10), and the total anode current can be expressed by Equation (11). According to the coating damage area, measure potential and total anode current data in Step 3, the least square method is used to fit the data of Equations (10) and (11). Since Equation (11) is applicable to the later data, the last five groups of data are used in fitting.

$$E_g = -1049 + 17.76 \ln(0.11 + A_2) \quad (12)$$

$$\ln i_g = 4.94 + 0.68 \ln(A_2) \quad (13)$$

Figure 3:
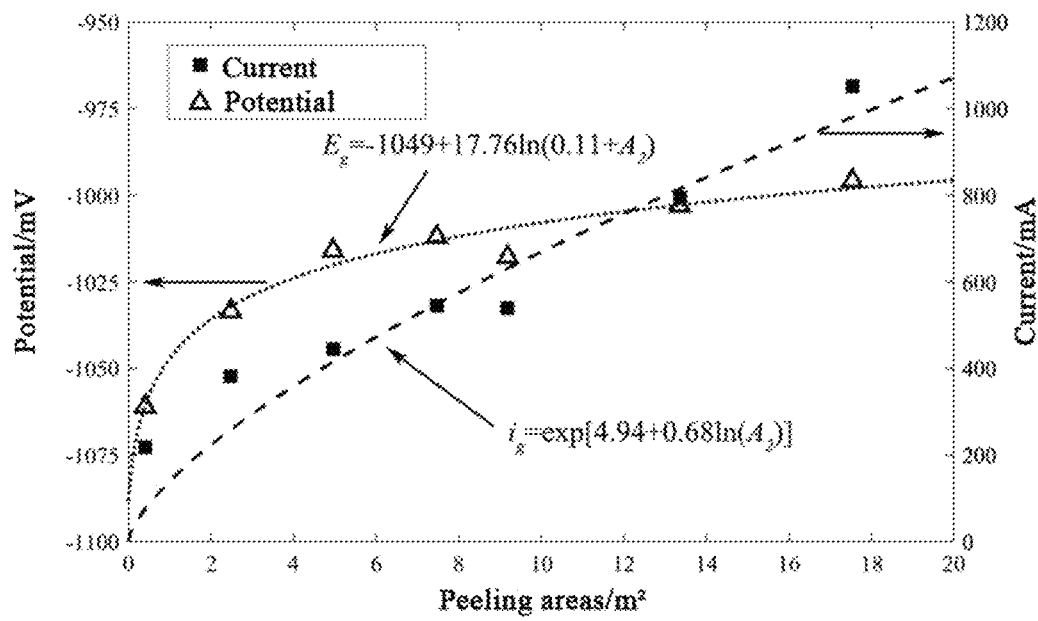
FIG. 3 Curve fitting diagram in the case.

The coefficients of determination of equations (12) and (13) are 0.9633 and 0.9268, respectively, indicating that the fitting is good. The variation trends of potential and anode current are consistent with Equations (10) and (11), and the curve fitting image is shown in FIG. 3, which can be used as the relationship model between the peeling area of organic coating and the mixing potential and anode current.

Step 5: Real-time monitoring of the actual service coating peeling area.

Figure 4:
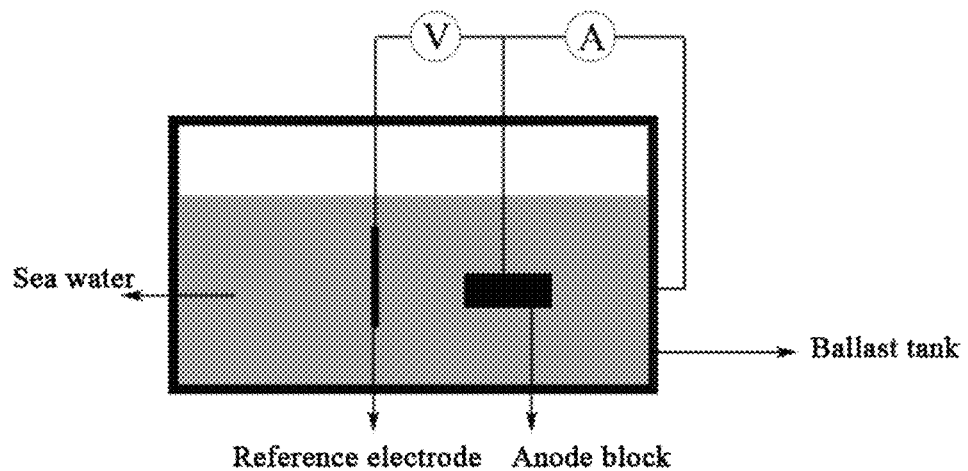
FIG. 4 Schematic diagram of organic coating deterioration monitoring system.

In this case, the coating metal structure is the ship ballast tank, the coating service environment is the seawater environment, and the sacrificial anode method is used for cathodic protection. Therefore, zero-resistance galvanometer, reference electrode and voltmeter can be directly connected to the anode and cathode loop to realize real-time monitoring of anode working current or potential. The specific structure is shown in FIG. 4. After obtaining the anode working current and mixing potential, the area of coating peeling can be directly deduced according to Equations (12) and (13).

$$A_2 = \exp\left(\frac{E_g + 1049}{17.76}\right) - 0.11 \quad (14)$$

$$A_2 = \exp\left(\frac{\ln i_g - 4.94}{0.68}\right) \quad (15)$$

Equation (14) can be used to estimate the peeling area of the coating structure at the initial service stage, and Equation (15) can be used to estimate the peeling area at the later service stage.

The results show that the method of the invention can be used to evaluate the protective performance of the organic anti-corrosion coating by analyzing the change of the electrochemical parameters of the organic coating with time, and achieve the expected purpose.

In sum, the present invention relates to a method based on electrochemical theory to evaluate the peeling area of organic anticorrosive coatings based on epoxy resins on metal structures. This method evaluates the peeling area of organic anticorrosion coatings based on the fundamental equation of electrochemical polarization, mixed potential theory and the corrosion galvanic couple theory. The method systematically establishes a correlation model between the potential of the metal substrate, the anode current and the peeling area of the organic coating based on the potential monitoring data in the organic anti-corrosion coating/metal matrix system, the anode current monitoring data under the condition of an external anode metal, and the corrosion galvanic couple principle. The correlation model is a quantitative model method for describing the deterioration process of organic coatings. The method maps the deterioration state of the organic anti-corrosion coating to the active area of the metal matrix, which is convenient for the identification of the peeling state of the coating and further life evaluation.

The specific steps of the method are:

Step 1: Determine the actual service environment of the coating structure and prepare the simulated electrolyte solution.

Step 2: Select the anode block for testing.

Step 3: Test the corrosion current and potential of the coating structure under different manual peeling areas.

Step 4: Fit the peeling area model of organic coating.

Step 5: Real-time monitoring of the actual service coating peeling area.

The invention is applicable to the service life evaluation of coating structure with epoxy resin as the main coating material in seawater full immersion environment and other fields. It has the characteristics of simple test method, easy to operate and not damaging to the structure, and has broad application value.

What is claimed is:

1. An electrochemical method for a field monitoring of protective properties of an organic coating in a seawater environment, wherein a peeling area of the organic coating being a parameter affecting an anticorrosive performance of the organic coating; and a cathodic disbonding failure of the organic coating being due to an effect of a cathodic reaction or cathodic reaction products on a bonding between the organic coating and a substrate metal, resulting in a separation of the organic coating from the substrate metal;

a corrosion potential of an anode and cathode electrode reaction being far from an equilibrium potential of the anode and cathode electrode reaction between two electrodes, so an inverse process of the anode and cathode electrode reaction between the two electrodes being ignored; and a kinetic formula of each electrode reaction being expressed by a Tafel formula $$I_a = I_{0,a} \exp\left(\frac{E - E_{e,a}}{\beta_a}\right) \quad (1)$$

$$|I_c| = I_{0,c} \exp\left(-\frac{E - E_{e,a}}{\beta_a}\right) \quad (2)$$

wherein $I_a$ is an anode electrode reaction current density, $I_{0,a}$ is a current exchange density at an anode electrode reaction equilibrium, E is an electrode potential applied currently; $E_{e,a}$ is an anode electrode reaction equilibrium potential, $I_c$ is a cathode electrode reaction current density, $I_{0,c}$ is a cathode electrode reaction current exchange density at a cathode electrode reaction equilibrium, and $E_{e,c}$ is a cathode electrode reaction equilibrium potential;

a velocity of a corrosion process of a corroded metal electrode being not controlled by a diffusion process of a cathode reaction; and a potential-current curve of the corroded metal electrode conforming to a three-parameter polarization curve equation:

$$I = I_{corr}\left[\exp\left(\frac{\Delta E}{\beta_a}\right) - \exp\left(-\frac{\Delta E}{\beta_a}\right)\right] \quad (3)$$

wherein, I is an external measured current density, $\Delta E$ is a polarization value of the corroded metal electrode, $\beta_a$ is a first anode tafel slope of the corroded metal electrode, $\beta_c$ is a first cathode tafel slope of the corroded metal electrode;

in a test electrolyte, a depolarizer being involved in the anode and cathode electrode reaction, and only an anodic reaction and only the cathodic reaction being carried out at the same time on each isolated electrode, instead of multiple electrode reactions occurring at the same time; and in an electrode reaction process, a mass transfer process being fast, and a concentration polarization being neglected; and before the organic coating being peeled off, an anti-corrosion performance of the organic coating separating a metal matrix from a corrosive medium; wherein, the metal matrix produces no electrochemical corrosion, and the metal matrix under the organic coating is regarded as not participating in an electrochemical reaction; the electrochemical method comprises:

step 1: determining an actual service environment of a structure of the organic coating and preparing a simulated electrolyte solution; wherein the actual service environment of the organic coating is sampled to measure types and concentrations of ions related to a corrosion reaction in the seawater environment; a concentration and a pH of a dissolved oxygen in seawater samples are measured; according to the actual service environment of the structure of the organic coating, an electrolyte solution of a test system is the simulated electrolyte solution or a real solution of the actual service environment of the structure of the organic coating; in the electrolyte solution, the types and the concentrations of the ions are consistent with the actual service environment to ensure the corrosion reaction and corrosion products of the structure of the organic coating are the same as the actual service environment, and the depolarizer controls the corrosion reaction with the metal matrix in the electrolyte solution;

step 2: selecting an anode block for testing; wherein a coated metal sample is used as a working electrode; an inert metal electrode is used as an auxiliary electrode; a saturated silver chloride electrode is used as a reference electrode; and the simulated electrolyte solution in the step 1 is used as a test electrolyte solution to constitute an electrochemical test three-electrode system;

a metal matrix sample is immersed in the test electrolyte solution to polarize for a first period of time, and an open circuit potential of the metal matrix sample is monitored; after the open circuit potential of the metal matrix sample is stabilized, a polarization curve of the metal matrix sample in the test electrolyte solution is measured; the open circuit potential of the metal matrix sample is converted into a standard hydrogen electrode potential according to a type of the reference electrode, and an electrode reaction standard potential table is searched to find a first metal with an electrode reaction potential much lower than the electrode reaction potential of the inert metal electrode to be tested (above 400 mV), wherein the inert metal electrode is used as a test anode metal; and the test anode metal is made into a sample, and a working area of the test anode metal is designed to be about 2%-3% of a whole of a coated metal structure; the anode block is immersed in the test electrolyte solution for a polarization for a second period of time, and an open circuit potential of the anode block is measured; after the open circuit potential of the anode block is stable, a polarization curve of the anode block in the test electrolyte solution is measured;

step 3: testing a corrosion current and a potential of the structure of the organic coating under different manual peeling areas; wherein the coated metal structure to be tested and the anode block are immersed into the test electrolyte solution and connected through a wire; under an action of a cathodic polarization, the anodic reaction of the coated metal structure is inhibited, and the cathodic reaction is promoted; in a whole galvanic corrosion system, the coated metal structure becomes a cathode, and the anode block becomes an anode; a non-resistance ammeter is connected in series to an anode and cathode circuit to measure a working current of the anode block, and an anode current is recorded when the anode current is stable; then, the reference electrode is immersed in the test electrolyte solution and connected in series with the coated metal structure to be tested; a potential difference between the reference electrode and the coated metal structure is measured by a voltmeter; a potential of the coated metal structure is calculated by adding a standard potential and the potential difference of the reference electrode; after a measurement is completed, a certain area of the organic coating is damaged artificially, and a second metal under the organic coating is immersed in the test electrolyte solution to make a direct contact with the test electrolyte solution; the measurement is repeated; and the certain area damaged artificially is gradually increased, and an anode working current and the potential of the coated metal structure are measured several times;

step 4: fitting a peeling area model of the organic coating; wherein when the anode block and the coated metal structure to be tested exist as isolated electrodes in the test electrolyte solution, the corrosion potential is $E_{corr1}$ and $E_{corr2}$, corrosion current densities are $I_{corr1}$ and $I_{corr2}$, respectively; when the coated metal structure is connected with the anode block by the wire in the test electrolyte solution, the coated metal structure and the anode block form a corrosion galvanic couple; in the corrosion galvanic couple, the coated metal structure to be tested becomes the cathode, and the anode block becomes the anode; under a condition of ignoring the concentration polarization and a solution resistance, the coated metal structure is considered to be polarized to a same potential $E_g$ after connecting with the anode block, wherein a polarization current density $I_1$ of the anode block and a polarization current density $I_2$ of the coated metal structure containing the organic coating are $$I_1 = I_{corr1}\left[\exp\left(\frac{E_g - E_{corr1}}{\beta_{a1}}\right) - \exp\left(-\frac{E_g - E_{corr1}}{\beta_{c1}}\right)\right] \quad (4)$$

$$|I_2| = I_{corr2}\left[\exp\left(\frac{E_g - E_{corr2}}{\beta_{a2}}\right) - \exp\left(-\frac{E_g - E_{corr2}}{\beta_{c2}}\right)\right] \quad (5)$$

where, $\beta_{a1}$ is a second anode Tafel slope on the anode block; $\beta_{c1}$ is a second cathode Tafel slope on the anode block; $\beta_{a2}$ is a third anode Tafel slope on the coated metal structure; $\beta_{c2}$ is a third cathode Tafel slope on the coated metal structure; if areas of a contact between the test electrolyte solution of the anode block and the coated metal structure are $A_1$ and $A_2$, then a current $i_g$ in an external circuit of the whole galvanic corrosion system is $$i_g = I_1 A_1 = |I_2| A_2 \quad (6)$$

since the corrosion potential of the anode block is much lower than the corrosion potential of the coated metal structure, $E_g$ is far away from $E_{corr2}$ and close to $E_{corr1}$; therefore, the anodic reaction on a surface of the coated metal structure is ignored, but the cathodic reaction on a surface of the anode block is not ignored; thus, equation (6) is simplified as $$i_g = I_{a1}A_1 - |I_{c1}|A_1 = |I_{a2}|A_2 \quad (7)$$

where, $I_{a1}$ is an anode dissolution current density after the contact between the anode block and the coated metal structure, $|I_{c1}|$ and $|I_{a2}|$ are an absolute value of a cathodic reduction current density of the depolarizer on the anode block and an absolute value of a cathodic reduction current density of the depolarizer on the coated metal structure after the contact between the anode block and the coated metal structure, respectively;

substituting equations (1) and (2) into equation (7), the following equation can be solved:

$$E_g = \frac{\beta_{a1}}{\beta_{a1} + \beta_c} E_{e,c} + \frac{\beta_c}{\beta_{a1} + \beta_c} E_{e,a1} + \frac{\beta_{a1}\beta_c}{\beta_{a1} + \beta_c} \ln\left(\frac{A_1 I_{0,c1} + A_2 I_{0,c2}}{A_1 I_{0,a1}}\right) \quad (8)$$

$$\ln i_g = \frac{E_{e,c} - E_{e,a1}}{\beta_{a1} + \beta_c} + \frac{\beta_{a1}}{\beta_{a1} + \beta_c} \ln(A_1 I_{0,c1}) + \frac{\beta_c}{\beta_{a1} + \beta_c} \ln(A_2 I_{0,c2}) - \frac{\beta_{a1}}{\beta_{a1} + \beta_c} \ln\left(1 + \frac{A_1 I_{0,c1}}{A_2 I_{0,c2}}\right) \quad (9)$$

where, $E_{e,c}$ is a cathodic reaction equilibrium potential of the depolarizer, $E_{e,a1}$ is an anode reaction equilibrium potential on the anode block, $I_{0,a1}$ is an anode reaction exchange current density on the anode block, $I_{0,c1}$ is a cathodic reaction exchange current density on the anode block, and $I_{0,c2}$ is a cathodic reaction exchange current density on the coated metal structure;

equation (8) is simplified as $$E_g = a + b\ln(c + A_2) \quad (10)$$

wherein, a, b, and c are constants;

$A_2$ gradually increases with a peeling of the organic coating; when $A_2 \gg A_1$, equation (9) is simplified as follows:

$$\ln i_g = e + f\ln(A_2) \quad (11)$$

wherein, e and f are constants;

equations (10) and (11) describe a relationship between a potential and current and the peeling area of the organic coating; wherein, the equation (10) is logarithmic and a slope gradually decreases with an increase of the peeling area; the equation (10) is suitable for characterizing an early service period of the organic coating; the equation (11) is a power function; the equation (11) is only available when the peeling area is large; the equation (11) is suitable for characterizing a later service period of the organic coating; data of the potential and current measured in the step 3 are used to fit parameters of the equations (10) and (11), and a relationship model between the peeling area of the organic coating and the potential and current is obtained; and step 5: real-time monitoring of an actual service coating peeling area; wherein due to a low resistivity of the seawater environment, the anode block is connected to the coated metal structure with a seawater medium and a small structure volume; the non-resistance ammeter, the reference electrode, and the voltmeter are connected in a loop to realize a function of estimating the peeling area of the organic coating by a real-time monitoring of a current or a potential; a specific method is to connect a zero-resistance galvanometer, the reference electrode, and the voltmeter in the anode and cathode circuit to realize the function of real-time monitoring the anode working current or potential; after an anode current and a mixing potential are obtained, the peeling area of the organic coating is backward deduced according to the equations (10) and (11) to realize the function of the real-time monitoring of a protection performance of the organic coating.

* * * * *